No. 873,562. PATENTED DEC. 10, 1907.
R. G. LARZELERE.
WIRE STRETCHER.
APPLICATION FILED AUG. 13, 1907.
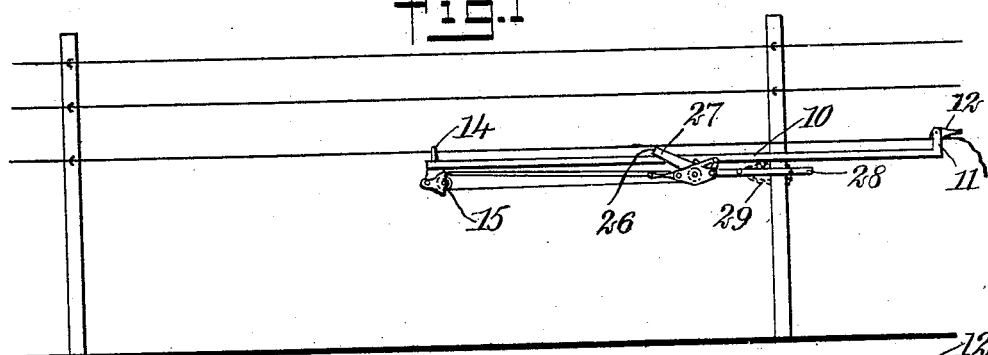
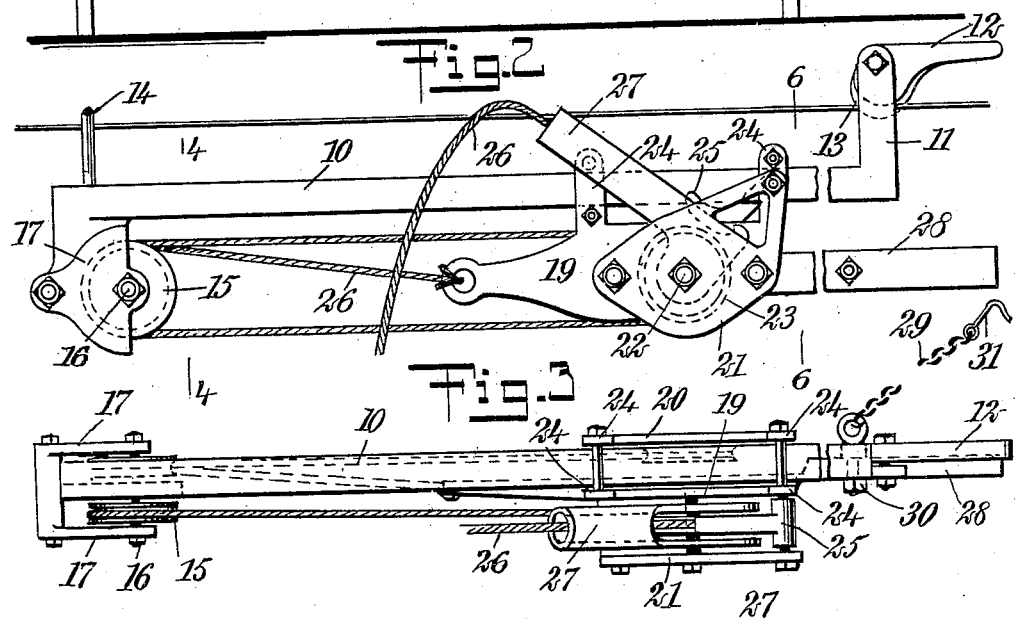
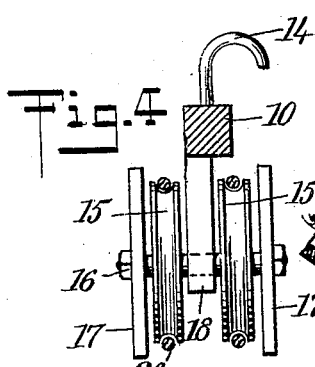
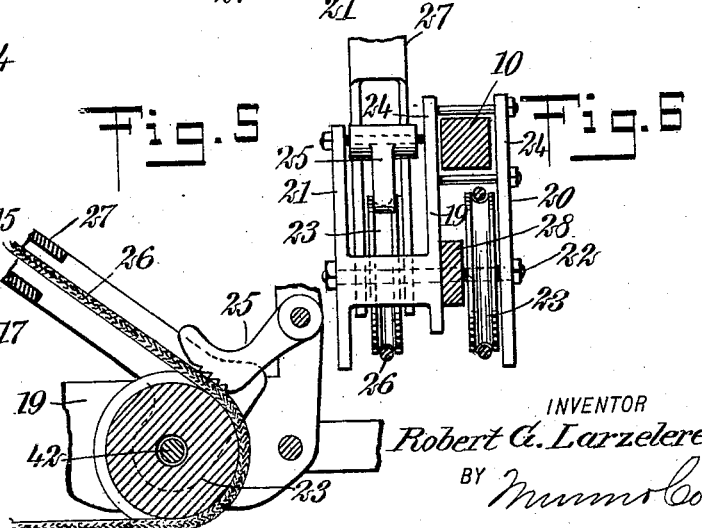
WITNESSES
INVENTOR
Robert G. Larzelere
BY Munn & Co
ATTORNEYS

UNITED STATES PATENT OFFICE.

ROBERT GOULD LARZELERE, OF WATHENA, KANSAS.

WIRE-STRETCHER.

No. 873,562.     Specification of Letters Patent.     Patented Dec. 10, 1907.

Application filed August 13, 1907. Serial No. 388,312.

*To all whom it may concern:*

Be it known that I, ROBERT GOULD LARZELERE, a citizen of the United States, and a resident of Wathena, in the county of Doniphan and State of Kansas, have invented new and useful Improvements in Wire-Stretchers, of which the following is a full, clear, and exact description.

This invention has reference to improvements in wire stretchers more especially designed for stringing fence wires, and having for an object primarily to draw the wire taut in advance of the post where its next fastening is to be made, and thus provide ample space for the stapling.

The invention further resides in certain special features of construction and arrangement of parts which will be fully set forth hereinafter and particularly pointed out in the claims.

Reference is to be had to the accompanying drawings forming a part of this specification, in which similar characters of reference indicate corresponding parts in all the views.

Figure 1 illustrates my improved wire stretcher in side elevation as it is applied in stretching fence wires; Fig. 2 is a view similar to Fig. 1 on an enlarged scale; Fig. 3 is a plan of the wire stretcher; Fig. 4 is a cross section on the line 4—4 of Fig. 2; Fig. 5 is a fragmentary sectional view through the operating lever and contiguous parts; and Fig. 6 is a cross section on the line 6—6 of Fig. 2.

My improved wire stretcher in its preferred construction comprises a beam 10 having an upwardly-turned forward or outer end 11 to which is pivotally attached a cam lever 12 having a flange 13 formed at the outside thereof and coacting with a shoulder formed on the part 11 against which the wire is clamped.

The opposite end of the beam 10 carries an upwardly-projecting hook 14 for suspending this end of the beam from the wire, and is also provided with sheaves 15 arranged at each side of the longitudinal center on its under side, as best shown in Fig. 4, the said sheaves being journaled on a bolt or other axis 16 which is supported at its opposite ends by side-plates 17 and at its center by a lug 18 depending from the beam.

A slide is carried by the beam composed of a center-plate 19 and side-plates 20 and 21 rigidly secured together by bolts or other suitable devices and between which are journaled on a bolt or other axis 22, sheaves 23 arranged in alinement with the sheaves 15. The sliding connection between this slide 19 and the beam 10 is effected by providing the center-plate 19 and side-plate 21 with upwardly-projecting ears 24 through which bolts are inserted both above and below the beam. One of said ears 24 also serves in connection with an extended portion of the side-plate 21 to support the pivot of a dog 25, the said dog being serrated on its under edge and operating under the influence of gravity to automatically clamp a flexible line 26 to one of the sheaves 23 and prevent the backward movement thereof as the line is drawn forward by the operation of a lever 27. The lever 27, as shown in Figs. 5 and 6, is made hollow for the reception of the line 26 and is journaled on the axis 22 at the opposite sides of one of the sheaves 23. By turning the line back over the end of the lever to prevent it from slipping and then depressing the lever, it is obvious that the line is drawn forward. The line 26 is attached to the center-plate 19, as best shown in Fig. 2, and alternately passes over the sheaves 15 and 23 before it is brought out through the open end of the lever 27, thus multiplying the power as applied at the slide in moving the beam 10 and attached parts forwardly to stretch the wire.

The center-plate 19 of the slide is extended at its forward end to provide an arm 28 which is adapted to lie flat against one side of the post and be secured thereto by a chain 29 which is attached to the arm by an eyebolt 30, the chain being provided with a hook 31 for engaging one of its links after it is passed about the post.

It is apparent from the construction as shown and described, that the free end of the wire which is clamped by the cam-lever 12 will be considerably in advance of the post to which the stretcher is secured, when the slide is operated to bring the wire under sufficient tension, thus providing ample space for stapling the tightly drawn wire to the post.

The invention as shown and described while being the preferred practical embodiment of my improved stretcher, may nevertheless be modified within the scope of the appended claims.

Having thus described my invention, I claim as new and desire to secure by Letters Patent:

1. In a wire stretcher, a beam, means for clamping the wire at one end of the beam, a slide carried by the beam, means for securing the slide in a fixed position, and means for shifting the beam longitudinally of the slide.

2. In a wire stretcher, a beam, means for clamping the wire at one end of the beam, means for suspending the beam from the wire at its opposite end, a slide carried by the beam, means for securing the slide in a fixed position, and means for shifting the beam longitudinally of the slide.

3. In a wire stretcher, a beam, means for clamping the wire carried by the beam, a slide carried by the beam, means for securing the slide in a fixed position, sheaves carried by both the slide and the beam, and a line attached to the slide and passing over said sheaves.

4. In a wire stretcher, a beam, means for clamping the wire carried by the beam, a slide carried by the beam, means for securing the slide in a fixed position, sheaves carried by both the slide and the beam, a line attached to the slide and passing over said sheaves, and a lever for operating the line.

5. In a wire stretcher, a beam, means for clamping the wire carried by the beam, a slide carried by the beam, means for securing the slide in a fixed position, sheaves carried by both the slide and the beam, a line attached to the slide and passing over said sheaves, a lever for operating the line, and a dog coacting with one of said sheaves for preventing the backward movement of the line.

6. In a wire stretcher, a beam, a cam-lever pivotally supported at one end of the beam for clamping the wire thereto, a hook for suspending the opposite end of the beam, a slide carried by the beam, sheaves carried by the slide, sheaves carried by the beam adjacent to said hook, means for securing the slide in a fixed position, a line attached to the slide and passing over said sheaves, and a hollow lever through which said line passes for drawing on said line.

7. In a wire stretcher, a beam, means for clamping the wire to the beam, a slide carried by the beam comprising side-plates and a center-plate having sheaves journaled therebetween, a plurality of sheaves journaled on the beam, an arm attached to said center-plate, means for securing said arm in a fixed position, a hollow lever carried by the slide, and a line secured to the center-plate of the slide and pasing over said sheaves and through said lever.

8. In a wire stretcher, a beam, a clamp for securing the wire at one end and at the top of the beam, means for suspending the beam at its opposite end, a slide suspended from the beam having a sheave journaled therein, a sheave carried by the beam adjacent to said suspending means, means for securing the slide in a fixed position, a hollow lever carried by the slide, and a line attached to the slide and passing over said sheaves and thence through said lever.

In testimony whereof I have signed my name to this specification in the presence of two subscribing witnesses.

ROBERT GOULD LARZELERE.

Witnesses:
R. H. LARZELERE,
ALONZO RICE.